(12) United States Patent
Pignataro et al.

(10) Patent No.: US 11,784,928 B2
(45) Date of Patent: *Oct. 10, 2023

(54) SYSTEM AND METHOD FOR DATAPLANE-SIGNALED PACKET CAPTURE IN IPV6 ENVIRONMENT

(71) Applicant: Cisco Technology, Inc., San Jose, CA (US)

(72) Inventors: Carlos M. Pignataro, Raleigh, NC (US); Richard Furr, Fredericksburg, VA (US); Nagendra Kumar Nainar, Morrisville, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,933

(22) Filed: Apr. 25, 2022

(65) Prior Publication Data

US 2022/0329523 A1 Oct. 13, 2022

Related U.S. Application Data

(63) Continuation of application No. 16/364,468, filed on Mar. 26, 2019, now Pat. No. 11,343,182, which is a
(Continued)

(51) Int. Cl.
*H04L 45/74* (2022.01)
*H04L 43/028* (2022.01)
(Continued)

(52) U.S. Cl.
CPC ............ *H04L 45/74* (2013.01); *H04L 43/028* (2013.01); *H04L 43/04* (2013.01); *H04L 43/10* (2013.01); *H04L 45/566* (2013.01)

(58) Field of Classification Search
CPC ..... H04L 45/74; H04L 45/566; H04L 43/028; H04L 43/04; H04L 43/10
(Continued)

(56) References Cited

U.S. PATENT DOCUMENTS

| 7,626,938 | B1 | 12/2009 | Orr et al. |
|---|---|---|---|
| 2002/0026525 | A1 | 2/2002 | Armitage |

(Continued)

FOREIGN PATENT DOCUMENTS

| CN | 104125107 | 10/2014 |
|---|---|---|
| CN | 105187304 | 12/2015 |

(Continued)

OTHER PUBLICATIONS

Brockners, F., "In-Band OAM for IPv6 Cisco Live," retrieved on Sep. 20, 2019 at https://www.ciscolive.com/c/dam/r/ciscoolive/US/docs/2015.pdfBRKRST-2606.pdf.
(Continued)

*Primary Examiner* — Chi Tang P Cheng
(74) *Attorney, Agent, or Firm* — Meunier Carlin & Curfman LLC

(57) ABSTRACT

Presented herein are methods and systems that facilitate data plane signaling of a packet as a candidate for capture at various network nodes within an IPv6 network. The signaling occurs in-band, via the data plane—that is, a capture or interrogation signal is embedded within the respective packet (e.g., in the packet header) that carries a user traffic. The signaling is inserted, preferably when the packet is classified, e.g., at the ingress node of the network, to which subsequent network nodes with the IPv6 network are signaled to capture or further inspect the packet for capture.

20 Claims, 14 Drawing Sheets

Related U.S. Application Data continuation of application No. 15/056,483, filed on Feb. 29, 2016, now Pat. No. 10,270,690.

(51) Int. Cl.
*H04L 43/04* (2022.01)
*H04L 43/10* (2022.01)
*H04L 45/00* (2022.01)

(58) Field of Classification Search
USPC .......................................................... 370/392
See application file for complete search history.

(56) References Cited

U.S. PATENT DOCUMENTS

| | | | |
|---|---|---|---|
| 2004/0052259 A1* | 3/2004 | Garcia | .................... H04L 43/00 |
| | | | 370/392 |
| 2005/0147050 A1* | 7/2005 | Klink | ..................... H04L 43/50 |
| | | | 370/244 |
| 2005/0243834 A1* | 11/2005 | Fukuda | .................. H04L 45/00 |
| | | | 370/395.1 |
| 2011/0080835 A1 | 4/2011 | Malomsoky et al. | |
| 2011/0222412 A1 | 9/2011 | Kompella | |
| 2012/0051229 A1* | 3/2012 | Feldmann | ............... H04L 43/12 |
| | | | 370/242 |
| 2012/0069845 A1* | 3/2012 | Carney | ............... H04L 63/1466 |
| | | | 370/392 |
| 2012/0218998 A1* | 8/2012 | Sarikaya | ............... H04L 69/167 |
| | | | 370/390 |
| 2014/0086253 A1 | 3/2014 | Yong | |
| 2014/0177428 A1 | 6/2014 | Sinha et al. | |
| 2014/0280717 A1 | 9/2014 | Frost et al. | |
| 2015/0016245 A1 | 1/2015 | Ra et al. | |
| 2015/0029872 A1* | 1/2015 | Pignataro | ................ H04L 45/24 |
| | | | 370/252 |
| 2015/0098356 A1 | 4/2015 | Bhattacharya | |
| 2016/0366051 A1 | 12/2016 | Chen et al. | |
| 2017/0005922 A1 | 1/2017 | Tantsura et al. | |
| 2017/0093611 A1 | 3/2017 | Arora et al. | |
| 2017/0111230 A1 | 4/2017 | Srinivasan et al. | |
| 2017/0155592 A1 | 6/2017 | Chen | |

FOREIGN PATENT DOCUMENTS

| | | |
|---|---|---|
| JP | 09331326 | 12/1997 |
| WO | 2015/165212 | 11/2015 |

OTHER PUBLICATIONS

Raza, K., et al., "IPv6 Router Alert Option for MPLS Operations, Administration, and Maintenance (OAM)," Internet Engineering Task Force (IETF), Apr. 2015, 6 pages.

Search Report, dated Apr. 15, 2021, received in connection with corresponding CN Patent Application No. 201780010124 (with English translation).

Search Report, dated Nov. 2, 2020, received in connection with corresponding CN Patent Application No. 201780010124 (English translation).

Search Report, dated Sep. 23, 2019, received in connection with EP Patent Application No. 19193192.

International Search Report and Written Opinion, dated Jun. 27, 2017, issued in connection with International Patent Application No. PCT/US2017/019857.

* cited by examiner

SYSTEM AND METHOD FOR DATAPLANE-SIGNALED PACKET CAPTURE IN IPV6 ENVIRONMENT

PRIORITY CLAIMS

This application is a continuation of U.S. patent application Ser. No. 16/364,468, filed on Mar. 26, 2019, entitled "SYSTEM AND METHOD FOR DATAPLANE-SIGNALED PACKET CAPTURE IN IPV6 ENVIRONMENT," which is continuation of U.S. patent application Ser. No. 15/056,483, filed on Feb. 29, 2016, entitled "SYSTEM AND METHOD FOR DATAPLANE-SIGNALED PACKET CAPTURE IN IPV6 ENVIRONMENT," the contents of which are hereby incorporated by reference its entirety.

TECHNICAL FIELD

The present disclosure relates to the servicing of packets within IPv6 networks, specifically, the signaling of packets for capture.

BACKGROUND

Internet Protocol version 6 (IPv6) is a communication protocol in an underlay network, and can be used to help realize various overlay technologies. For example, IPv6 may be implemented in cloud architectures to provide underlay network services for payloads such as L2 frames in overlay technologies such as EVPN ("Ethernet VPN") and NVO3 ("Network Virtualization Overlay"). IPv6 may also be used to provide underlay services, in tunneling technologies, for example, for IPv4 frames in V4-Over-V6 tunnels, or IPv6 frames in V6-in-V6 and SRv6 technologies, among others.

It is desired to capture packets in an IPv6 traffic flow, for example, by network administrators, for analysis—such as to identify applications operating on a given IPv6 network; identify points of intrusions to identify security flaws and breaches; identify data leakages; troubleshoot occurrences of undesired network events; identify and/or recover lost or stolen data and packets; determine extent of network elements comprised by virus and malware; assess impact of changes within a network; and ensure long-term compliance issues.

DESCRIPTION OF EXAMPLE EMBODIMENTS

Overview

Figure 1:
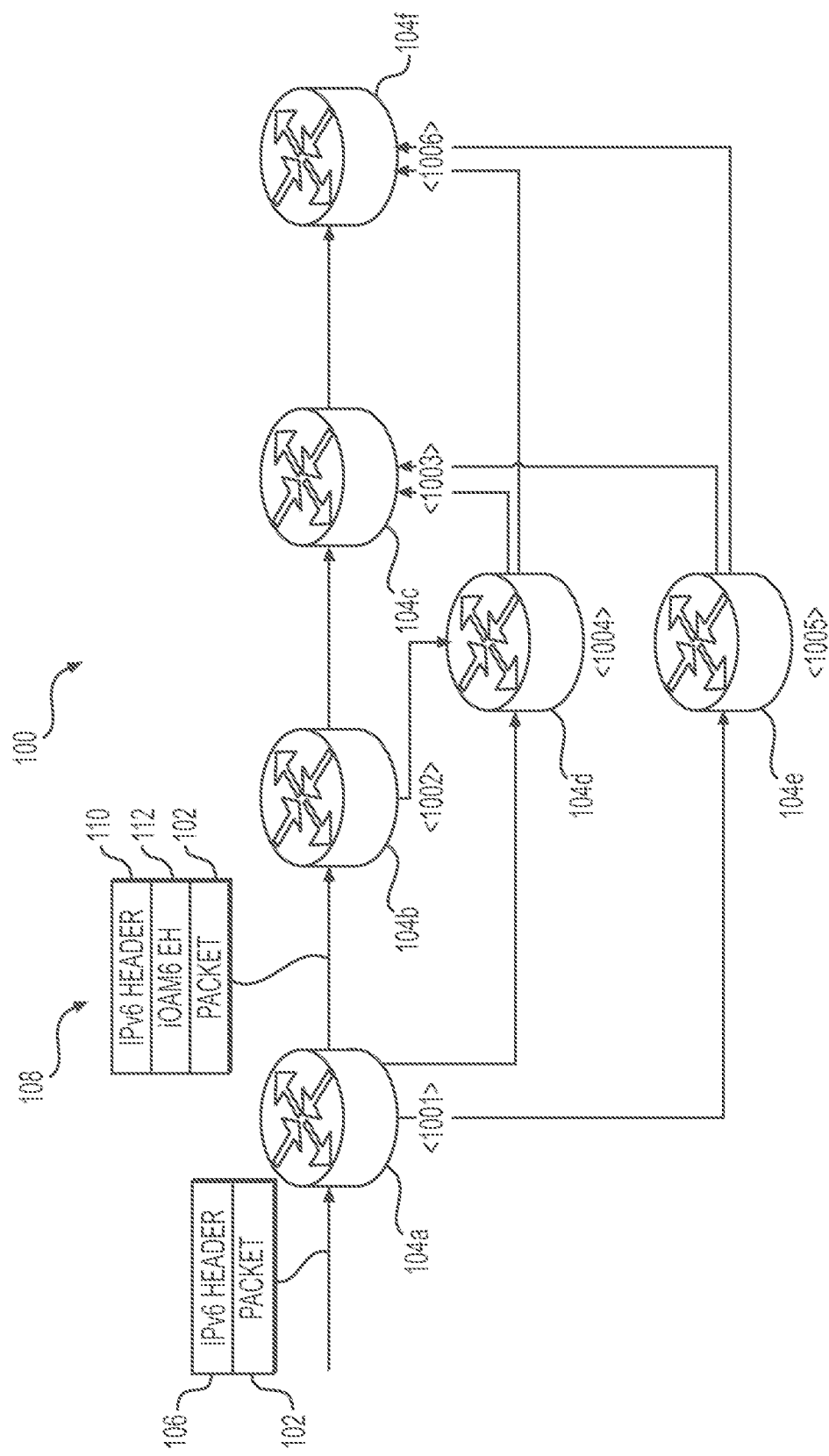
FIG. 1 is a diagram illustrating an example IPv6 network in which an IPv6 packet is dataplane signaled as a candidate for capture at one or more nodes within the IPv6 network, in accordance with an illustrative embodiment.

Presented herein are methods and systems that facilitate data plane signaling of a packet as a candidate for capture at various network nodes within an IPv6 network. The signaling occurs in-band, via the data plane—that is, a capture or interrogation signal is embedded within the respective packet (e.g., in the packet header) that carries a user traffic. The signaling is inserted, preferably when the packet is classified, e.g., at the ingress node of the network, to which subsequent network nodes within the IPv6 network are signaled to capture or further inspect the packet for capture.

EXAMPLE EMBODIMENTS

As a part of traffic analysis, monitoring, and troubleshooting of an IPv6 network, a network administrator or operator may have a need or desire to capture packet flow for a given flow of the network. To do so may require, for example, the capture of all traffic on a given interface. With the introduction of 100G and 400G links, it is not practically scalable to capture such flows. In addition, while control and data-plane elements are well understood, it is not currently possible to have full visibility of a packet at multiple points within an IPv6 network without deploying, at each of the points, a packet sniffer and protocol analyzer synchronized to one another or defining a complex filters to determine a packet for capture.

According to an aspect, a method is disclosed (e.g., of operating an ingress node in an IPv6 network, e.g., an IPv6 cloud having network virtualization overlay (NVO3) protocol, Ethernet Virtual Private Network (EVPN) protocol, V4-over-V6 tunnel protocol, IPv6 V6-in-V6 protocol, V6-over-V4 protocols (e.g., in NAT64 deployments), or IPv6 SRv6 protocol). The method includes receiving, at a first network node (e.g., an ingress node), a packet, to selectively route to one or more network nodes of a plurality of network nodes, collectively, forming the IPv6 network; receiving, at the first network node, one or more packet capture policies; and generating, at the first network node, an encapsulated packet to transmit to a network node in the IPv6 network, the encapsulated packet having an IPv6 header comprising an OAM (operations, administration and management) extension header, wherein the OAM extension header includes a capture instruction that signals at least one network node of the plurality of network nodes, payload of the IPv6 packet as a candidate for capture. An OAM extension header refers herein to any IPv6 extension header that is used for operation, administration, and management (OAM). In some embodiments, the OAM extension header is an iOAM6 (in-band-operating operation, administration, and management) extension header.

In some embodiments, the capture instruction of the OAM extension header includes an OAM type field having an associated capture instructions.

In some embodiments, the associated capture instructions of the OAM type field includes a direction of capture selected from the group consisting of: capture upon ingress to the node, capture upon egress to the node, and capture upon ingress and upon egress to the node.

In some embodiments, the capture instruction of the OAM extension header includes a first capture bit located at a flag portion of the OAM extension header, wherein the first capture bit is subsequently used to signal other network nodes in the IPv6 network of the packet as a candidate for capture.

In some embodiments, the method includes generating, at the first network node, the encapsulated packet with the OAM extension header, wherein the OAM extension header includes a second capture bit and a third capture bit each located at the flag portion of the OAM extension header, and wherein the second and third capture bits are subsequently used to signal other network nodes in the IPv6 network a capture direction selected from the group consisting of don't capture at the node; capture upon ingress at the node; capture upon egress at the node, and capture upon ingress and upon egress at the node. In some embodiments, each of the second and third capture bits is assigned to a capture direction (e.g., at ingress or at egress).

In some embodiments, the method includes, upon receiving, at a given network node, a given packet, the given network node is configured to scan the OAM extension header to determine presence of the capture instruction, and wherein, upon the capture instruction being determined to be present, the given network node is configured to capture the packet by: locally storing the packet in a memory of the given network node, or generate and forward a copy of the packet to a network node having an inspection, capture, or storage function. The network node also generates and forwards a modified packet having, in some embodiments, a modified IPv6 header that denotes receipt of the packet at this network node (e.g., having the TTL value (Time to Live) being decremented or e.g., having a second IPv6 header encapsulating the first received IPv6 header).

In some embodiments, the method includes generating, at the first network node, the encapsulated packet with the OAM extension header, wherein the OAM extension header includes an addressable identifier of the network node having the inspection, capture, or storage function.

In some embodiments, the one or more capture policies are selected from the group consisting of per-flow capture, per-destination capture, per-VPN (i.e., per-Virtual-Private-Network session) capture, interface type capture, time capture, and packet count capture.

In some embodiments, the first network node is located at an ingress of the IPv6 network.

In some embodiments, the plurality of network nodes include at least a device selected from the group consisting of a router, network addressor translation (NAT) device, an intrusion prevention system (IPS), an intrusion detection system (IDS), a deep packet inspection (DPI) device, a firewall, a switch, a computing device executing a virtual switch, a network-attached storage (NAS) device, a load balancer (LB) system, a wide-area network/local-area network (WAN/LAN) accelerator, and a computing system executing a virtual machine (VM).

In some embodiments, the method includes determining, by a processor of the first network node, based on the one or more packet capture policies, one or more network nodes to capture the IPv6 packet.

In some embodiments, the method includes determining, at the first network node, for the received packet, one or more transit nodes to route the packet to a destination node (e.g., via Equal-Cost Multi-Path routing protocol), the one or more transit nodes including a first transit node and a second transit node; and, in response to determining flow, or a parameter associated therewith, to the first network node and the second network node matching one of the one or more capture policies, generating, at the first network node, the encapsulated packet having a first IPv6 header associated with the first transit node and a second IPv6 header associated with the second transit node, wherein each of the first IPv6 header and the second IPv6 header comprises the OAM extension header having the capture instruction.

In some embodiments, the IPv6 network comprises a NVO3 ("network virtualization overlay") network or an EVPN ("Ethernet-Virtual Private Network") network having at least one transit node, including a first transit node, and wherein the one or more capture policies is used to determine a capture event at the first transit node, the method includes generating, at the first network node, the encapsulated packet by encapsulating the payload of the IPv6 packet, wherein the payload comprises a L2 frame.

In some embodiments, the IPv6 network includes a v6-in-v6 network, having at least one transit node, including a first transit node, and wherein the one or more capture policies is used to determine a capture event at the first transit node, the method includes generating, at the first network node, the encapsulated packet by duplicating a first IPv6 header of the received packet and inserting a second IPv6 header before the first IPv6 header, wherein the second IPv6 header includes a destination address associated with the first transit node, and wherein the second IPv6 header includes the OAM extension header having the capture instruction.

In some embodiments, the IPv6 network includes an IPv6 cloud having at least one transit node, including a first transit node, and wherein the one or more capture policies is used to determine a capture event at the first transit node, the method includes generating, at the first network node, the encapsulated packet by duplicating an IPv6 header of the received packet and inserting, to the IPv6 header, the OAM extension header having the capture instruction.

In some embodiments, the first network node is located at an ingress of the IPv6 network.

According to another aspect, a method of operating a transit node in an IPv6 network is disclosed. The method includes receiving, at a network node, an IPv6 packet, the IPv6 packet having a packet payload encapsulated by an IPv6 header comprising an OAM extension header; interrogating, at the network node, the OAM extension header; and in response to a determination of a capture instruction being present in the OAM extension header, causing the IPv6 packet to be either stored in a memory of the network node or forwarded to a remote computing device for interrogation or capture of the IPv6 packet.

In some embodiments, the method includes interrogating, at the network node, one or more capture bits in the OAM extension header, the one or more capture bits corresponding to the capture instruction, wherein the one or more capture bits include a first flag bit and a second flag bit, the first and second flag bits signaling a don't capture at the node; a capture upon ingress at the node; a capture upon egress at the node, and/or a capture upon ingress and upon egress at the node. In some embodiments, the first bit signals a capture action and a not-capture action upon ingress at the node, and wherein the second bit signals a capture action and a not-capture action upon egress at the node.

In some embodiments, the method includes interrogating, at the network node, an OAM type field in the OAM extension header, the OAM type field corresponding to the capture instruction, wherein the OAM type field includes an instruction selected from the group consisting of: instruct to capture the packet upon packet ingress at the node, instruct to capture the packet upon packet egress at the node, and instruct to capture the packet upon packet ingress and upon packet egress at the node.

In some embodiments, the method includes, in response to a determination of the capture instruction being present in the OAM extension header, i) replicating and forwarding a first IPv6 packet to the remote computing device having a packet capture and/or analysis function, the IPv6 packet, and ii) replicating and forwarding a second IPv6 to a destination IPv6 address identified in the IPv6 header.

According to another aspect, a system is disclosed (e.g., of operating an ingress node in an IPv6 network, e.g., an IPv6 cloud having network virtualization overlay (NVO3) protocol, Ethernet Virtual Private Network (EVPN) protocol, V4-over-V6 tunnel protocol, IPv6 V6-in-V6 protocol, or IPv6 SRv6 protocol). The system includes a processor; and a memory having instructions thereon, wherein the instructions, when executed by the processor, cause the processor to: receive a packet, to selectively route to one or more network nodes of a plurality of network nodes, collectively, forming the IPv6 network; receive one or more packet capture policies; and generate an encapsulated packet to transmit to a network node in the IPv6 network, the encapsulated packet having an IPv6 header comprising an OAM (operations, administration and management) extension header, wherein the OAM extension header includes a capture instruction, to at least one network node of the plurality of network nodes, payload of the IPv6 packet as a candidate for capture.

In some embodiments, the system include at least a device selected from the group consisting of a router, network addressor translation (NAT) device, an intrusion prevention system (IPS), an intrusion detection system (IDS), a deep packet inspection (DPI) device, a firewall, a switch, a computing device executing a virtual switch, a network-attached storage (NAS) device, a load balancer (LB) system, a wide-area network/local-area network (WAN/LAN) accelerator, and a computing system executing a virtual machine (VM).

As used herein, processor refers to a physical hardware device that executes encoded instructions for performing functions on inputs (e.g., from a network interface) and creating outputs (e.g., for an output network interface).

According to another aspect, a non-transitory computer readable medium is disclosed. The computer readable medium includes instructions, wherein the instructions, when executed by a processor of a computing device, cause the processor to: receive a packet, to selectively route to one or more network nodes of a plurality of network nodes, collectively, forming the IPv6 network; receive one or more packet capture policies; and generate an encapsulated packet to transmit to a network node in the IPv6 network, the encapsulated packet having an IPv6 header comprising an OAM (In-band-operating operations, administration and management) extension header, wherein the OAM extension header includes a capture instruction that signals at least one network node of the plurality of network nodes, payload of the IPv6 packet as a candidate for capture.

According to another aspect, a non-transitory computer readable medium is disclosed. The computer readable medium includes instructions, wherein the instructions, when executed by a processor of a computing device, cause the processor to: receive an IPv6 packet, the IPv6 packet having a packet payload encapsulated by an IPv6 header comprising an OAM extension header; interrogate the OAM extension header; and in response to a determination of a capture instruction being present in the OAM extension header, cause the IPv6 packet to be either stored in a memory of the network node or forwarded to a remote computing device for interrogation or capture of the IPv6 packet.

IPv6 Environment

FIG. 1 is a diagram illustrating an example IPv6 network in which an IPv6 packet is dataplane signaled as a candidate for capture at one or more nodes within the IPv6 network, in accordance with an illustrative embodiment.

As shown, the IPv6 network (e.g., implemented in an IPv6 cloud) provides an underlay network service for carrier and transport protocols such as EVPN "Ethernet VPN", NVO3 "network virtualization overlays", VxLAN "Virtual Extensible LAN (VXLAN)", among others, where L2 frames or L3 packets can be encapsulated with an IPv6 header. Examples of other protocols that may be encapsulated with the IPv6 header exemplified herein include IPv4 protocols used for V4-over-V6 tunnels and IPv6 protocols used for IPv6-in-IPv6 tunnels, and SRv6 (Segment Routing via IPv6).

To capture a packet (e.g., to determine specific flow) in the IPv6 network, the ingress node of the IPv6 cloud inserts an in-band capture signal to an extension header of the IPv6 header, namely the OAM extension header, to signal other nodes in the IPv6 network (to which, and through which, the IPv6 packet is forwarded) to interrogate or capture the IPv6 packet. The signaling allows the respective nodes in the IPv6 network to determine a given IPv6 packet as a candidate for capture without the use of capture filters.

In various network troubleshooting instances, packet sniffers and analysis may be used to look, or help look, deep into the packet header and/or payload. To improve analysis and resolution of the analysis, it is a common practice of capturing the packet at various capture points simultaneously, often requiring configuration and synchronization of multiple nodes (e.g., ingress, transit, egress). Traffic flow over Equal Cost Multi Path (ECMP) and heterogeneous environments have made analysis of packets more difficult in being able to configure the right set of nodes with the set of triggers, which may vary depending on the underlay network. These challenges directly impact "Mean Time To Repair" (MTTR) and operational efficiency.

In some embodiments, an ingress node signals, via dataplane signaling, other network nodes in the IPv6 network to capture a received packet. The dataplane signaling is via an encapsulation using an IPv6 header having an OAM type corresponding to a capture signal in an OAM extension header of the IPv6 header. In other embodiments, the received packet is encapsulated with an IPv6 header having a flag corresponding to a capture signal in the OAM extension header of the IPv6 header. The ingress node is instructed, e.g., by an operator, with a policy (e.g., capture policy—e.g., DSCP, source address, destination address, etc., per-VPN, packet count, time, etc.) to include a OAM type or flag in OAM hop-by-hop (HbH) Extension Header (EH) when either i) encapsulating the packet with a new IPv6 header or augmenting an existing IPv6 header with an OAM Extension header having the capture OAM type or capture flag. Consequently, a transit node, upon receiving the packet with a capture OAM type or capture flag in the OAM extension header, is configured to capture (e.g., take a snap shot of the packet) at the ingress of the transit node, at the egress (e.g., after header rewrite) of the transit node, or at both the ingress and egress of the transit node as specified by the OAM type or capture flag configurations in the extension header. During a capture, the transit node is configured to locally store the packet or forward the packet to a remote capture system (e.g., a centralized capture analysis server such as a storage area network (SAN)). When forwarding the packet to the remote capture system, the transit node, in some embodiments, produces a capture packet that includes the captured frame encapsulated with a new IPv6 header and extension header, which in combination carries forwarding and capturing instructions associated with the remote capture system. The forwarding and capturing instructions may include, but not limited to, a destination address, capture name, and/or capture server for the remote capture system. The remote capture system may be executing a Wireshark process, a network analysis process, or the like. Remote storage or analysis server may include database that may include one or more software and/or hardware components that cooperate to store, organize, sort, filter, and/or arrange data used by controllers and/or processors.

The ingress node of the IPv6 network may forward the packet to an egress node, for example, to tunnel therebetween through the network, or for example, it may direct the packet to a node, in the network, that is coupled or associated with a service function. The node may service the packet upon its receipt at transit node. Examples of such service functions include, but not limited to, network address translation (NAT), intrusion prevention, intrusion detection, firewall, storage, load balancing, network acceleration, etc.

Referring now to FIG. 1, the IPv6 network 100 includes a plurality of network nodes 104 (e.g., routers, shown as router 104a, router 104b, router 104c, router 104d, router 104d, router 104e, and router 104f; the routers 104a-104f have an IPv6 address of "<1001>", "<1002>", "<1003>", "<1004>", "<1005>", and "<1006>", respectively). An incoming packet is received at an ingress node 104a (shown as router 104a) in the IPv6 network 100; the packet 102 is encapsulated with an existing IPv6 header 106. The ingress node 104a is configured to classify the received packet 102 and determine, according to one or more policies enforced at the node 104a, a route to which the packet (collectively formed of 106 and 102) is to be directed, i.e., across a plurality of network nodes (e.g., routers 104b, 104c, 104d, 104e) in the IPv6 network, to reach egress node 104f. The ingress node 104a, in some embodiments, determines one or more nodes in the IPv6 network 100 to signal the capture of the packet thereat. The ingress node 104a generates an IPv6 packet 108 having the IPv6 header 110 (shown as "IPv6 Header" 110) and an OAM extension header 112 (shown as "iOAM6 EH" 112, as an example thereof) that encapsulates the packet 102; the extension header 112 having a capture instruction that dataplane signals to a transit node (e.g., 104b, 104c, 104d, 104e) to capture or interrogate the IPv6 packet 108. Each transit node (e.g., 104b, 104c, 104d, 104e) is configured to scan the IPv6 header 110 of the received IPv6 packet 108 and route (e.g., using conventional routing mechanisms such as forwarding tables) the packet to the destination address specified in the IPv6 header 110. Upon an IPv6 header having a capture instruction in the OAM extension header being received at the transit node, the transit node is configured to either locally store the packet or forward the packet to a remote storage system.

As shown in FIG. 1, assume the ingress node 104a is configured to forward the IPv6 packet 108 to an egress node 104f, over a traditional cloud network, via an ECMP ("Equal-Cost Multi-Path Routing") policy, to which the ingress node 104a, in this example, forwards the IPv6 packet to node 104d and node 104e. And, the ingress node is enforcing a capture policy to capture packets at each nodes under the ECMP protocol. To this end, the ingress node 104a generates a first and second IPv6 packet 108, each with an OAM extension header 116 that includes capture instructions upon which, a subsequent scan by node 104d and node 104e, results in node 104d and 104e capturing the packet. The packet 108 is forwarded to both nodes 104d and 104e and simultaneously captured thereat. To this end, the nodes 104d and 104e do not need to be configured with filters.

Figure 2:
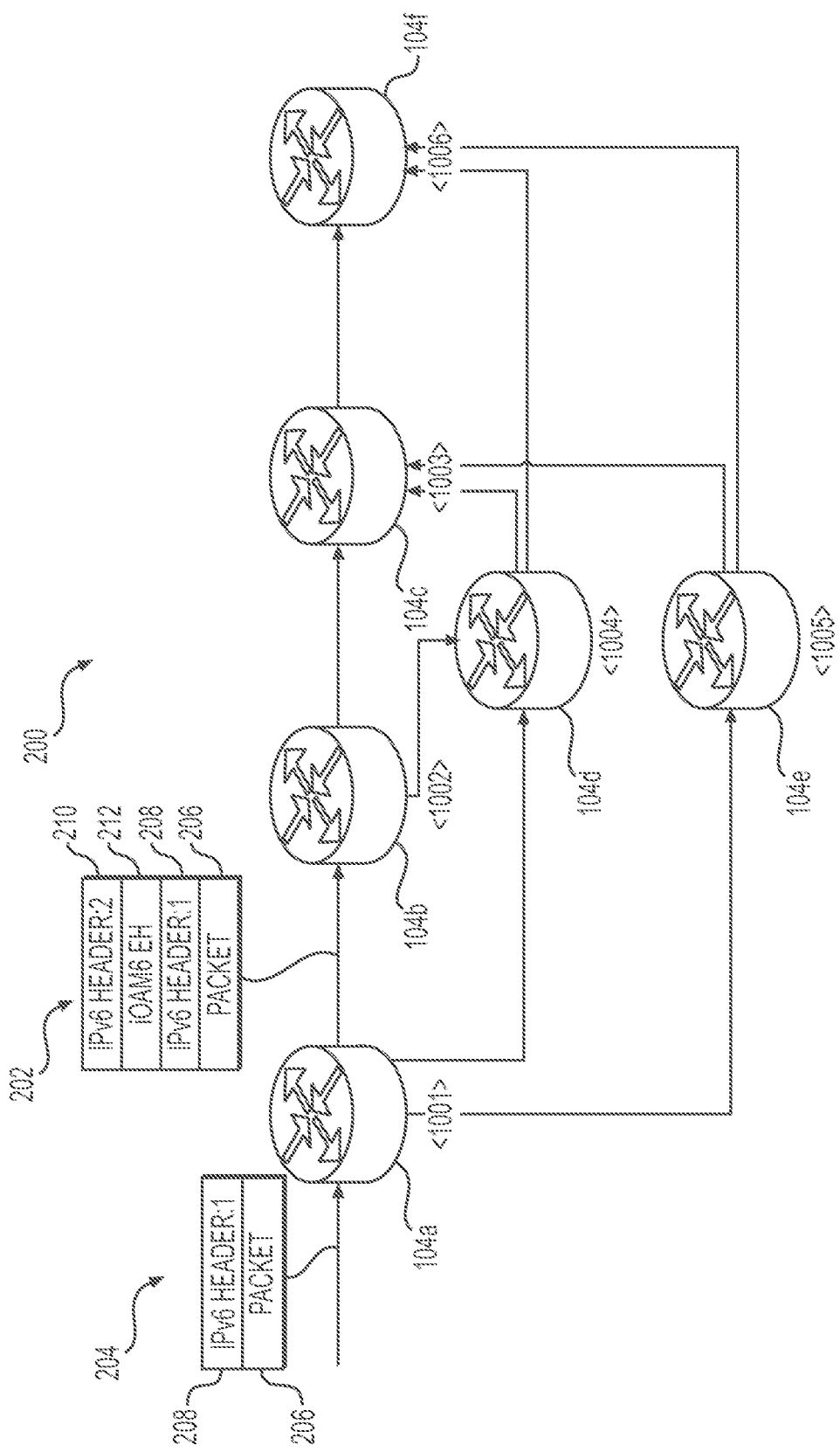
FIG. 2 is a diagram illustrating an example IPv6 network in which an IPv6 packet is dataplane signaled as a candidate for capture at one or more nodes within the IPv6 network, in accordance with another illustrative embodiment.

FIG. 2 is a diagram illustrating an example IPv6 network 200 in which an IPv6 packet 202 is dataplane signaled as a candidate for capture at one or more nodes within the IPv6 network, in accordance with another illustrative embodiment. As shown in FIG. 2, assume the ingress node 104a is configured to forward an incoming IPv6 packet 204 to egress node 104f, via ECMP ("Equal-Cost Multi-Path Routing") policy, but now over an overlay network such as NVO3 ("network virtualization overlay") or EVPN ("Ethernet VPN"). The incoming IPv6 packet 204 has a payload (shown as "packet 206") initially encapsulated by a first IPv6 header 208 (shown as "IPv6 Header:1" 208). To direct the packet 204 to the egress node 104f and capture the packet at various nodes (e.g., nodes 104d, and 104e) therealong to the node 104f, the ingress node 104a encapsulates the received packet 204 with a second IPv6 header 210 (shown as "IPv6 Header:2" 210) having an OAM extension header 212 (shown as "iOAM6 EH" 212, which has the exemplified capture instruction).

IPv6 Header and OAM Extension Header

Figure 3:
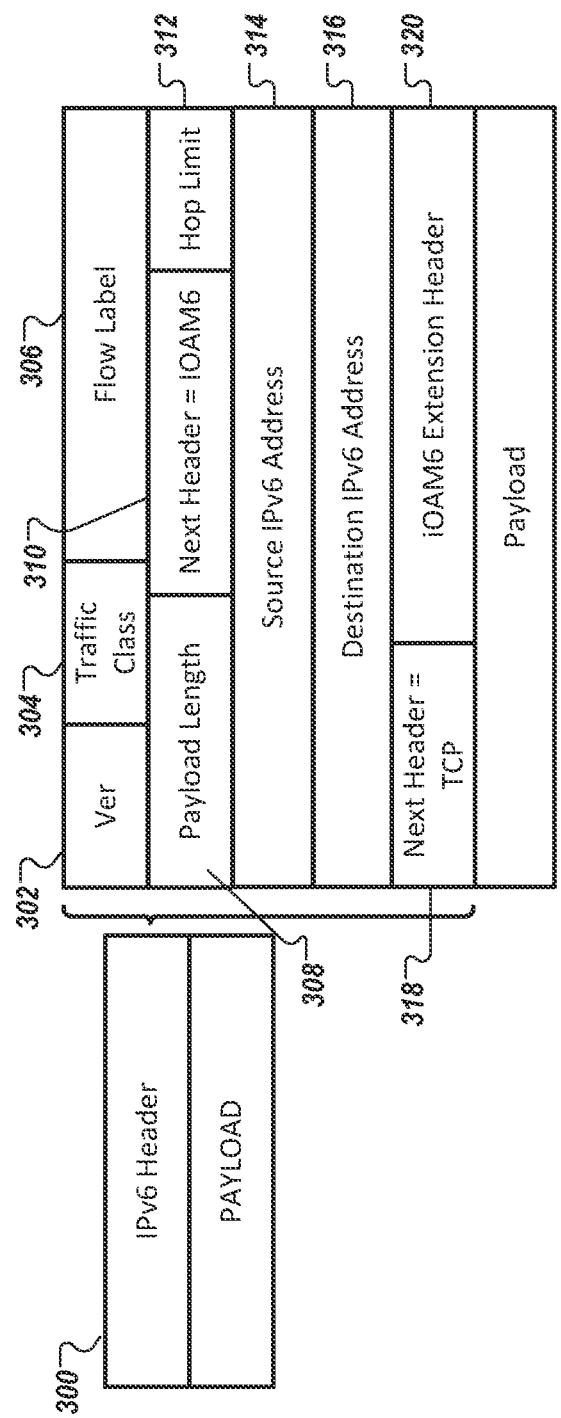
FIG. 3 illustrates an example IPv6 header having capture instructions, in accordance with an illustrative embodiment.
Figure 4:
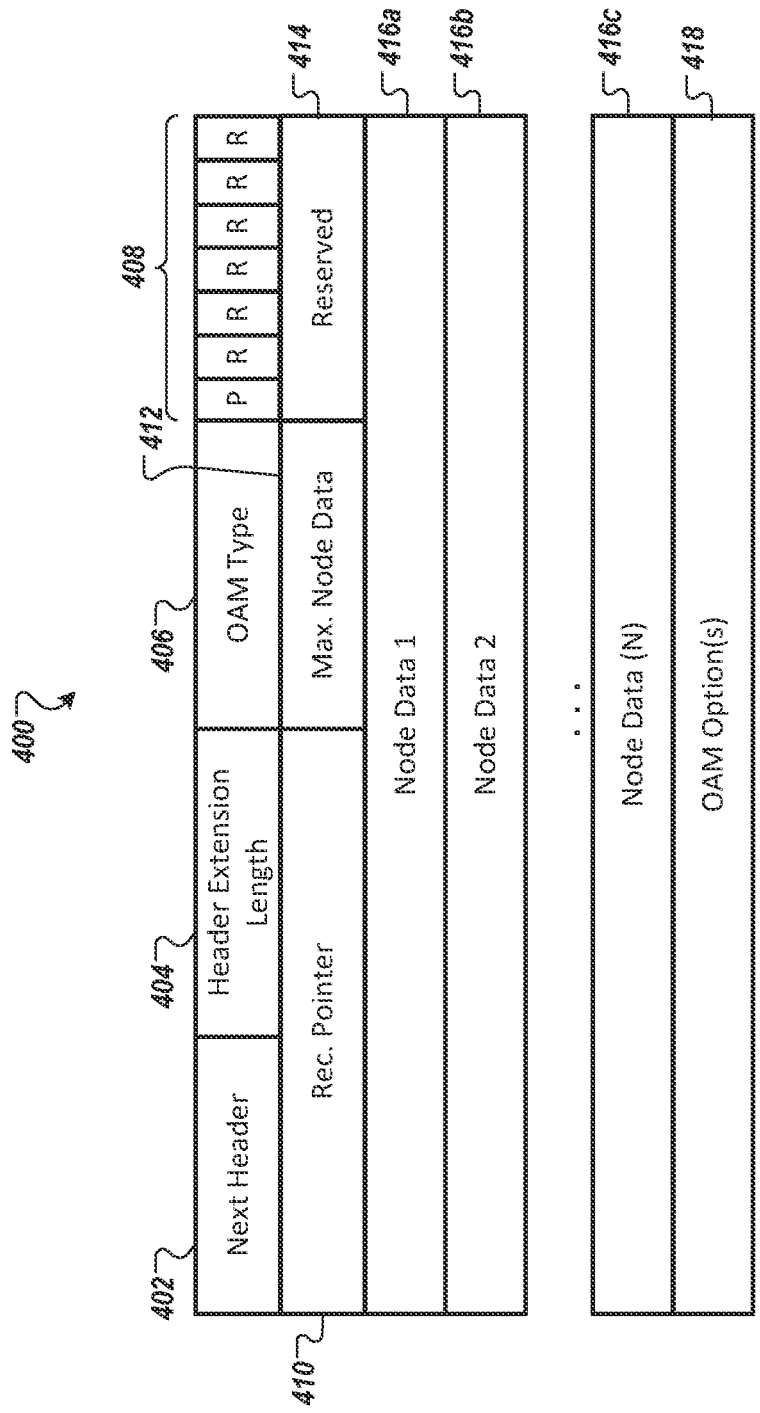
FIG. 4 illustrates an example OAM extension header having capture instructions, in accordance with an illustrative embodiment.

FIG. 3 illustrates an example IPv6 header, which may be used, as a header for an IPv6 packet, in accordance with an illustrative embodiment. FIG. 4 illustrates an example OAM extension header having capture instructions, in accordance with an illustrative embodiment. Details of the IPv6 header and OAM extension header are found at RFC2460 (namely, the Internet Protocol, Version 6 (IPv6) Specification) and at RFC6564 (namely, The Uniform Format for IPv6 Extension Headers), published by the Internet Engineering Task Force (IETF). An OAM extension header refers herein to any IPv6 extension header that is used for operation, administration, and management (OAM). In some embodiments, the OAM extension header is an iOAM6 (in-band-operating operation, administration, and management) extension header.

As shown in FIG. 3, the IPv6 header 300 includes a "Version" field 302, a "Traffic Class" field 304, a "Flow Label" field 306, a "Payload Length" field 308, a "Next Header" field 310, a "Hop Limit" field 312, a "Source IPv6 address" field 314, a "Destination IPv6 address" field 316, an "Extension Next Header" field 318, and an "iOAM Extension Header" 320.

According to RFC2460, the "Version" field 302 is a 4-bit Internet Protocol version number (the value being "6"). The "Traffic Class" field 304 is an 8-bit field for traffic class data that identifies and distinguishes between different classes or priorities of IPv6 packets. The "Flow Label" field 306 is a 20-bit field that may be used to label packets of a flow. The "Payload Length" field 308 is a 16-bit unsigned integer that specifies the length of the IPv6 payload in octets. The "Next Header" field 310 is an 8-bit selector that identifies the type of header immediately following the IPv6 header. The "Hop Limit" field 312 is an 8-bit unsigned integer that is decremented by "1" by each node that forwards the packet. The "Source IPv6 address" field 314 is a 128-bit address of the originator of the packet. The "Destination IPv6 address" field 316 is a 128-bit address of the intended recipient of the packet. The "Extension Next Header" field 318 identifies a number of extension headers. The "iOAM Extension Header" 320 is a hop-by-hop option type header.

FIG. 4 illustrates an example OAM extension header 400, in accordance with the illustrative embodiment. The OAM extension header 400 includes a "Next Header" field 402, a "Header Extension Length" field 404, and a variable length field comprising "an OAM type" field 406, a set of flags field 408, a "Recordation Pointer" field 410, a "Maximum Node Data" field 412, a set of reserved fields 414, a node data[n] fields 416 (shown as 416a, 416b, and 416c), and "OAM Option" field 418. a "Next Header" field 402, a "Header Extension Length" field 404, and a variable length field comprising "an OAM type" field 406, a set of flags field 408, a "Recordation Pointer" field 410, a "Maximum Node Data" field 412, a set of reserved fields 414, a node data[n] fields 416 (shown as 416a and 416b), and "OAM Option" field 418.

In some embodiments, an OAM type field 406 is associated with capture. In some embodiments, the OAM type field 406 may specify capture semantics, such as direction of capture, that provide granular control of the capture at a given node. Table 1 illustrates example OAM types, in accordance with an illustrative embodiment.

| OAM Type Identifier | Action |
| --- | --- |
| OAM Type "X" | Capture at ingress and egress direction |
| OAM Type "Y" | Capture at ingress only |
| OAM Type "Z" | Capture at egress only |

As shown in Table 1, OAM types are specified for three types of captures—i) capture at ingress and egress direction, ii) capture at ingress only, and iii) capture at egress only.

In other embodiments, one or more flags of the flags field 408 are specified for dataplane capture signaling. In some embodiments, a single capture bit is designated to signal a packet as a candidate for capture. In other embodiments, multiple capture bits are designed, with the combination being used to designate granular control of capture. For example, 2 bits may be used where each bit denotes a type of capture, e.g., at the ingress or at the egress. To this end, a "0" value at each bit indicates "no capture"; a "0" at bit0 and "1" at bit1 indicate capture at the ingress; a "1" at bit0 and a "0" at bit1 indicate capture at the egress; and a "1" at each bit indicates a capture at both ingress and egress. In some embodiments, the value of "0" denote a capture signal or a non-capture signal. In some embodiments, the bit0 is associated with egress capture and bit1 is associated ingress capture.

In addition, in some embodiments, the "OAM options" field includes allocated space for capture name, file name, server name, and server destination address, among other, that can be associated with the capture signal.

Modifications of the exemplified OAM extension header and IPv6 header may be made without departing from the spirit of the embodiments discussed herein.

Capture Policy

Capture policy to classify a packet as a candidate for packet capture may be based on one or more classifications policies. The classification policy may be based on packet header field (e.g., Differentiated Services Code Point (DSCP), source address, destination address, and L4 information), incoming interface, per-VPN, etc.

Figure 5:
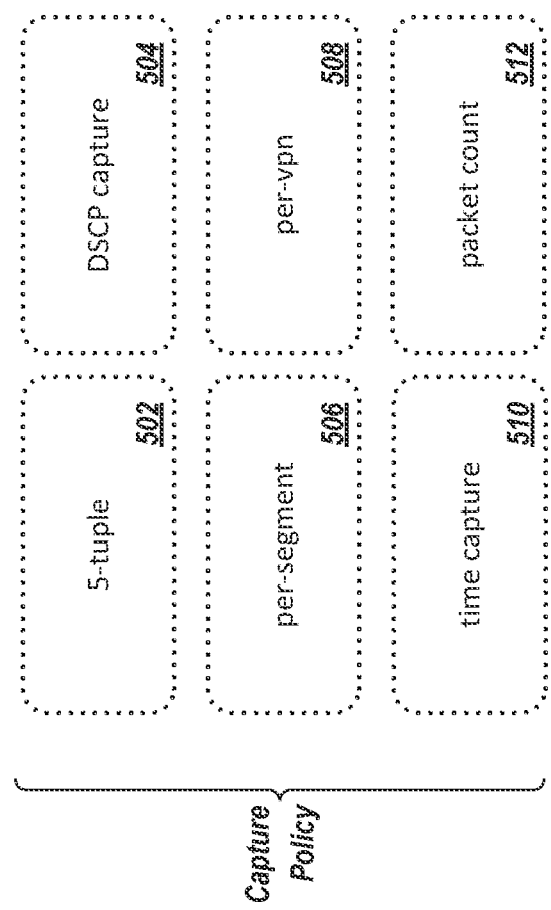
FIG. 5 depicts a diagram of capture policies for IPv6 packets in an IPv6 network, in accordance with an illustrative embodiment.

FIG. 5 depicts a diagram of capture policies for IPv6 packets in an IPv6 network, in accordance with an illustrative embodiment. These examples of capture policies are merely illustrative and are not provided as a limiting examples.

As shown, a first capture policy 502, in some embodiments, is based on Layer ¾ five-tuple parameters. A classifier, running this policy 502, may signal one or more IPv6 packets, as a candidate for packet capture, if the packet includes a set of one or more parameters matching a specified five-tuple classification, or a specified portion thereof— for example, a matched IP source address parameter, a matched UDP/TCP source port parameter, a matched IP destination address parameter, a matched UDP/TCP destination port parameter, and a matched protocol identifier parameter.

In addition, a second capture policy 504, in some embodiments, is based on Differentiated Services Code Point (DSCP) classification of the packet. A classifier, running this policy 504, may signal one or more IPv6 packets, as a candidate for packet capture, that include a specified DSCP classification parameter.

In addition, a third capture policy 506, in some embodiments, is based on a per flow ("per-destination") basis 506. That is, capture at each transit node allow a flow to a destination address.

In addition, a fourth capture policy 508, in some embodiments, is based on a per-flow basis for a given forwarding path. A classifier, running this policy 508, may signal one or more IPv6 packets as a candidate for capture based on a flow or application type (e.g., video, audio, data, VOIP).

A fifth capture policy 510 is based on a specified time window parameter. A classifier, running this policy 510, may select one or more IPv6 packets that are specified within a time window. In some embodiments, the time window may be specified by a period of time following a specified triggered event.

A sixth capture policy 512 is based on packet counts. A classifier, running this policy 512, may select a specified number of packets (e.g., IPv6 packets) for capture. The capture may be invoke following a triggered event.

Figure 6:
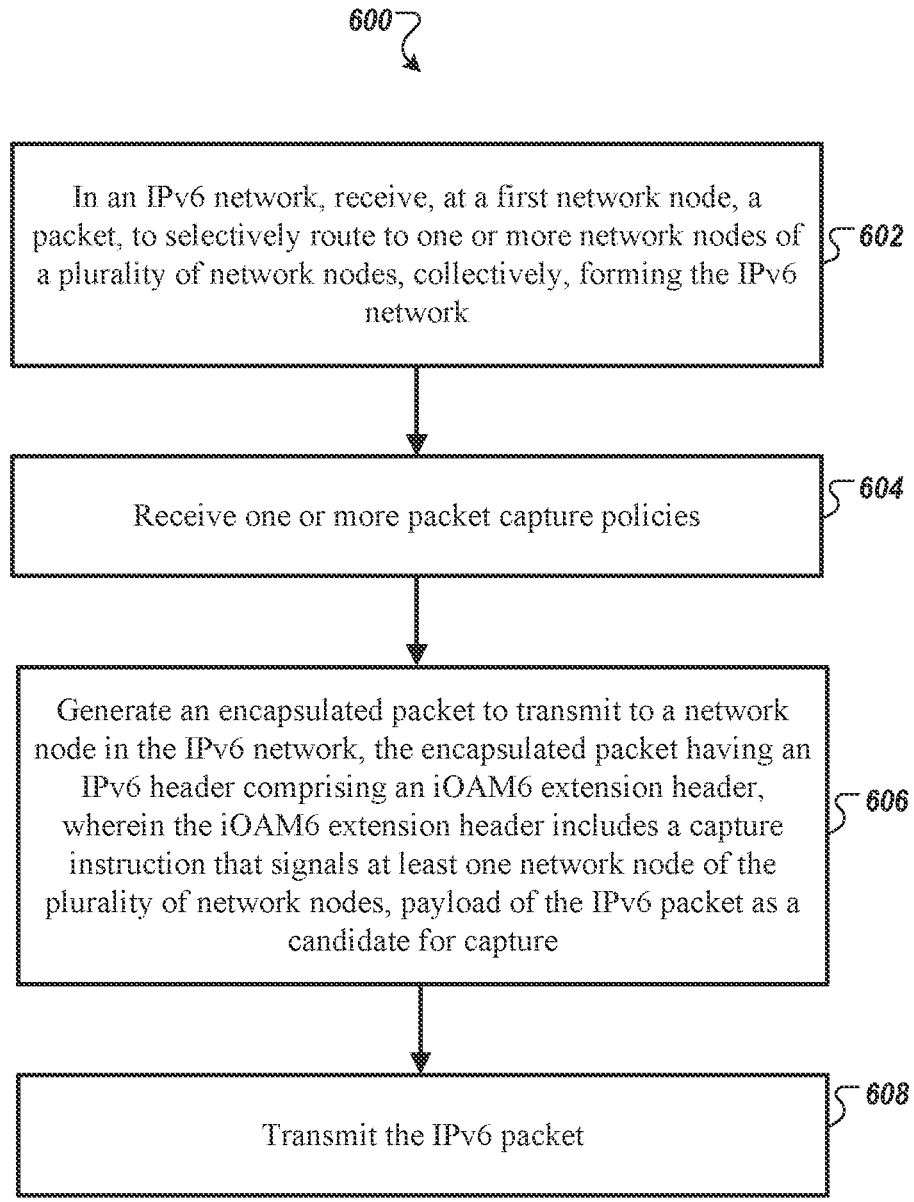
FIG. 6 depicts a flow diagram of a method of operation, for an ingress node of a network, for data plane signaling of a packet as a candidate for capture, in accordance with an illustrative embodiment.

FIG. 6 depicts a flow diagram of a method 600 of an operation, for an ingress node of a network, for data plane signaling of a packet as a candidate for capture, in accordance with an illustrative embodiment. The method 600 is described in relation to FIGS. 1 and 2.

The method 600, at step 602, includes, in an IPv6 (Internet Protocol Version 6) network, receiving, at a first network node, a packet, to selectively route to one or more network nodes of a plurality of network nodes, collectively, forming the IPv6 network.

The method 600, at step 604, includes receiving, at the first network node, one or more packet capture policies. The capture policies may be received, for example, from cloud-based controller operatively linked to the ingress node.

The method 600, at step 606, includes generating, at the first network node (e.g., 104a), an encapsulated packet (e.g., 108 or 202) to transmit to a network node in the IPv6 network (e.g., 100 or 200), the encapsulated packet (e.g., 108 or 202) having an IPv6 header (e.g., comprising an OAM (operations, administration and management) extension header, wherein the OAM extension header includes a capture instruction that signals to at least one network node of the plurality of network nodes, payload of the IPv6 packet as a candidate for capture. In some embodiments, the capture instruction comprises an OAM type in the OAM extension header. In other embodiments, the capture instruction comprises one or more capture flags in the OAM extension header.

The method 600, at step 608, includes transmitting, at the first network node, the generated IPv6 packet to a next network node.

Figure 7:
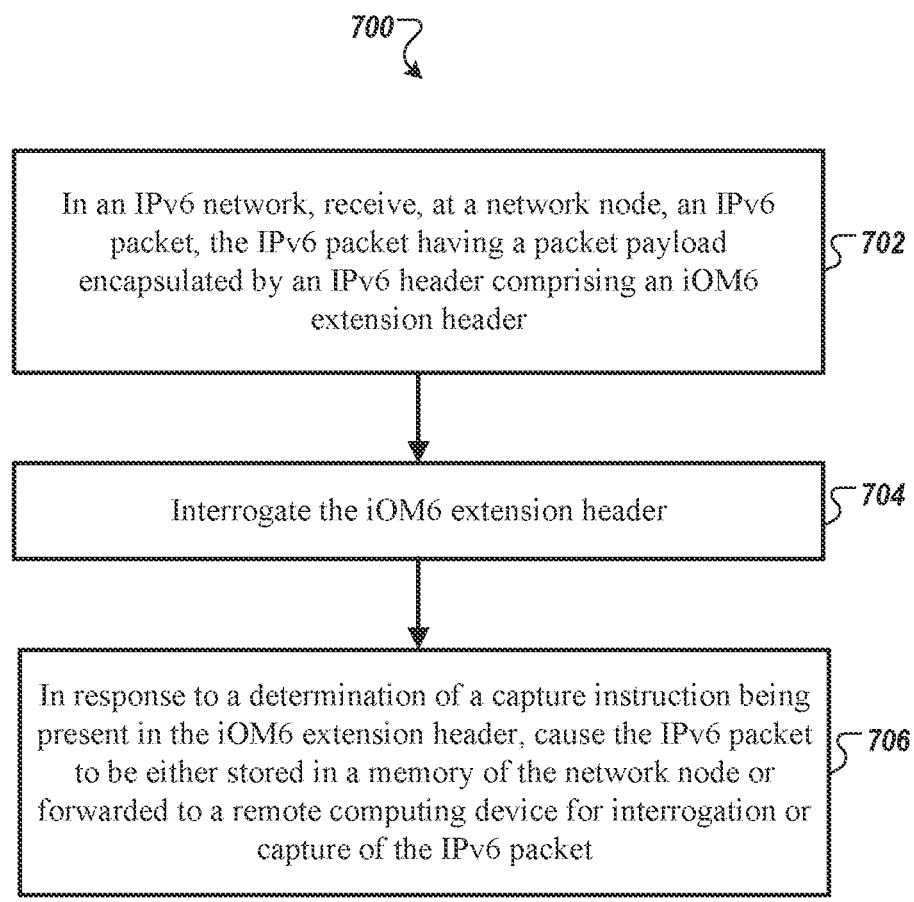
FIG. 7 depicts a flow diagram of a method of operation, for a transit node, upon receiving an IPv6 packet, in accordance with an illustrative embodiment.

FIG. 7 depicts a flow diagram of a method 700 of operation, for a transit node, upon receiving an IPv6 packet, in accordance with an illustrative embodiment.

The method 700, at step 702, includes receiving, at a network node, an IPv6 packet, the IPv6 packet having a packet payload encapsulated by an IPv6 header comprising an OAM extension header.

The method 700, at step 704, includes interrogating, at the network node, the OAM extension header.

The method 700, at step 706, includes, in response to a determination of a capture instruction being present in the OAM extension header, causing the IPv6 packet to be either stored in a memory of the network node or forwarded to a remote computing device for interrogation or capture of the IPv6 packet. In some embodiment, the remote computing device (e.g., a storage server) is assigned a node; the network node encapsulates the captured packet and pushes the encapsulated captured packet to the node to the remote computing device—whereby the packet is tunneled to the server. In some embodiments, the node may establish an IPv6 or a MPLS (multi-protocol label stack) tunnel to a remote computing device.

Figure 8:
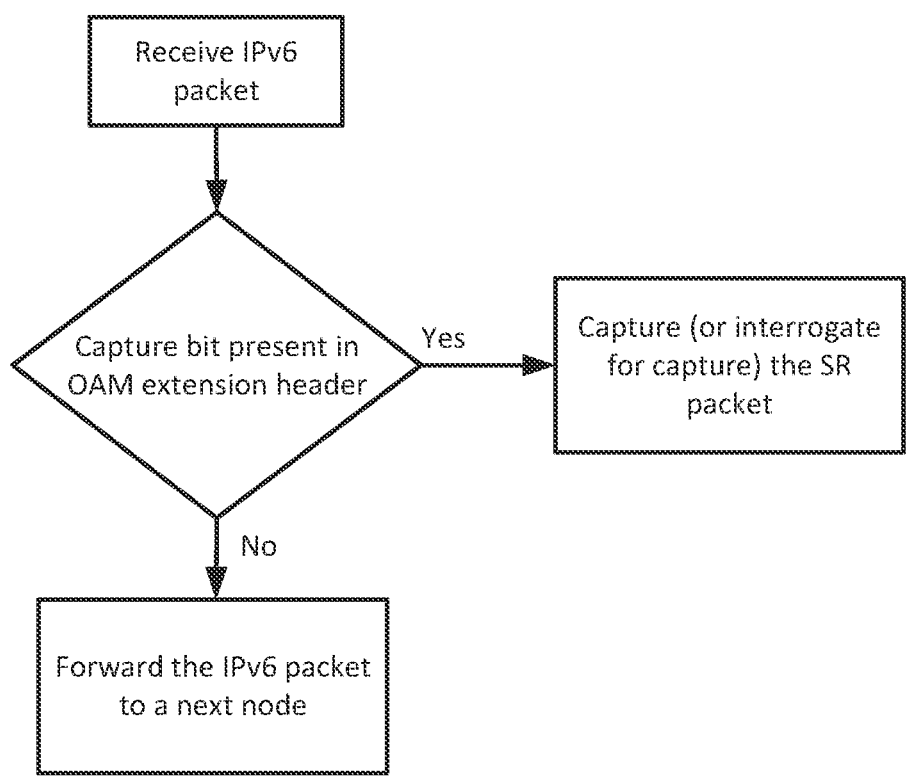
FIGS. 8-10, comprising FIGS. 8, 9, and 10, each depicts a flow diagram illustrating an interrogation operation performed by a transit node to determine a capture action (e.g., in response to receiving an IPv6 packet), in accordance with an illustrative embodiment.
Figure 9:
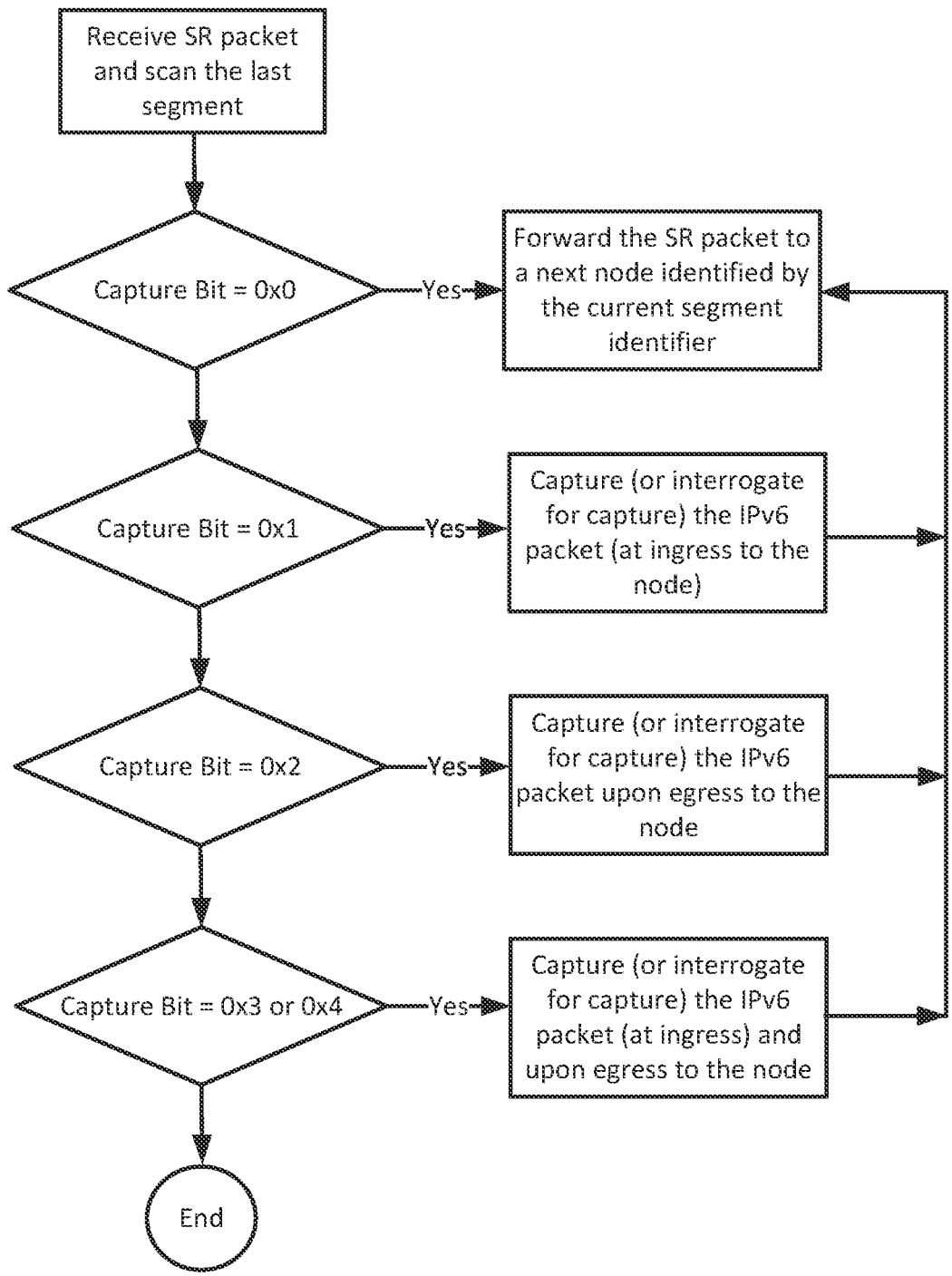
Figure 10:
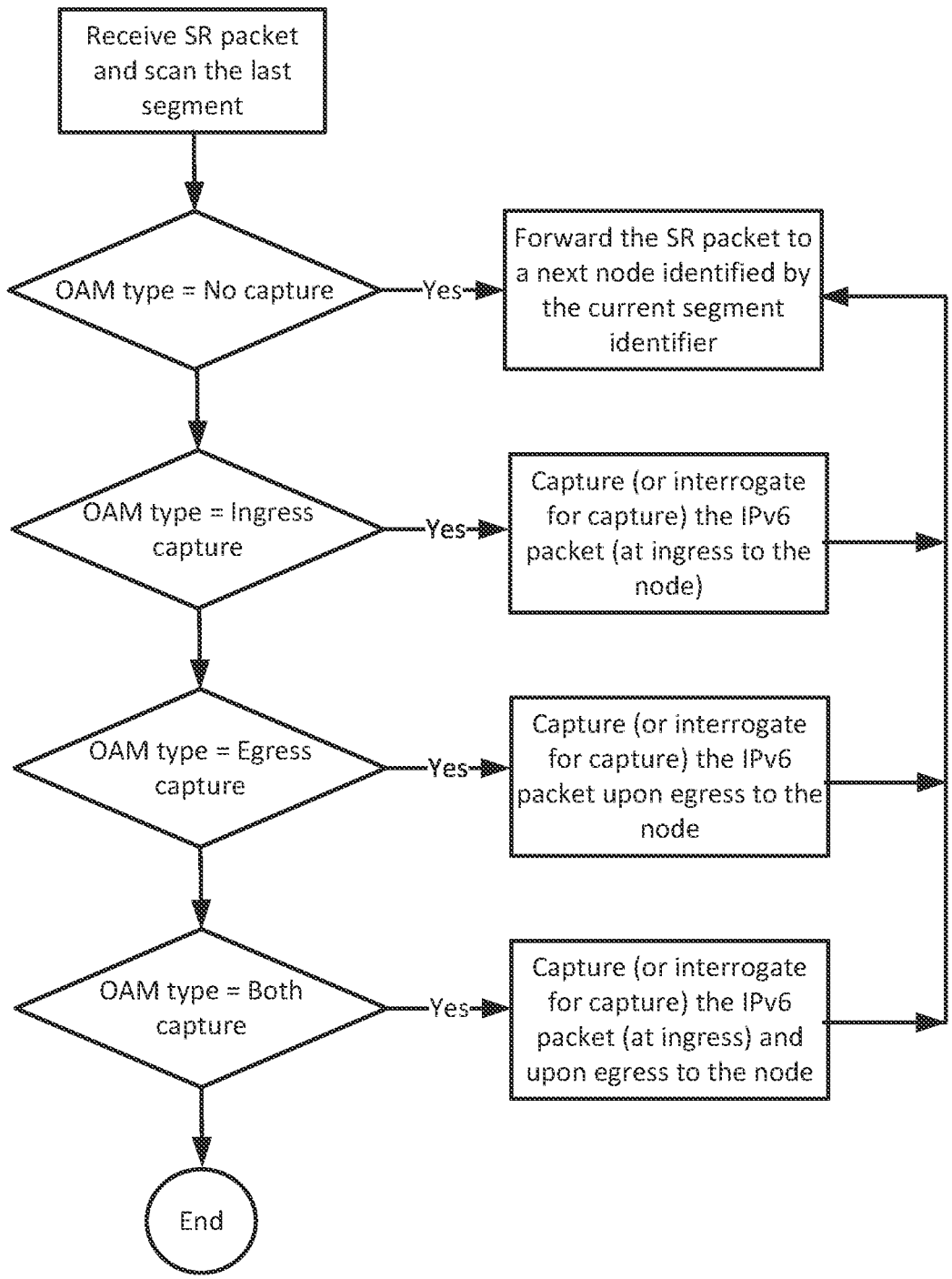

FIGS. 8-10, comprising FIGS. 8, 9, and 10, each depicts a flow diagram illustrating an interrogation operation performed by a transit node to determine a capture action (e.g., in response to receiving an IPv6 packet), in accordance with an illustrative embodiment.

In FIG. 8, upon receipt of an IPv6 packet, a network node (e.g., a transit node) is configured to interrogate a capture flag in an OAM extension header of an IPv6 header. Upon the capture flag being determined to have a capture bit value (e.g., a "1"), the network node is configured to capture (e.g., locally store the packet or forward the packet to a remote storage system) or interrogate the packet (e.g., via deep packet inspection analysis).

In FIG. 9, upon receipt of an IPv6 packet, a network node (e.g., a transit node) is configured to interrogate a plurality of capture flags in an OAM extension header of an IPv6 header, wherein each flag is associated with a capture at a particular direction (e.g., ingress or egress). Upon one of the capture flags being determined to have a capture bit value (e.g., "1"), the network node is configured to capture or interrogate, at the specified ingress or egress, the received packet. To this end, upon both the capture flags being determined to each have a capture bit value, the network node is configured to capture at both at the ingress and the egress of the packet from the node.

In FIG. 10, upon receipt of an IPv6 packet, a network node (e.g., a transit node) is configured to interrogate an OAM type field in an OAM extension header of an IPv6 header, wherein a type value associated with a capture instruction directs the node to perform the instructions. For example, upon the OAM type field having an instruction to capture at the ingress, at the egress, and at both the ingress and egress, the network node is configured to capture according to such instructions.

Figure 11:
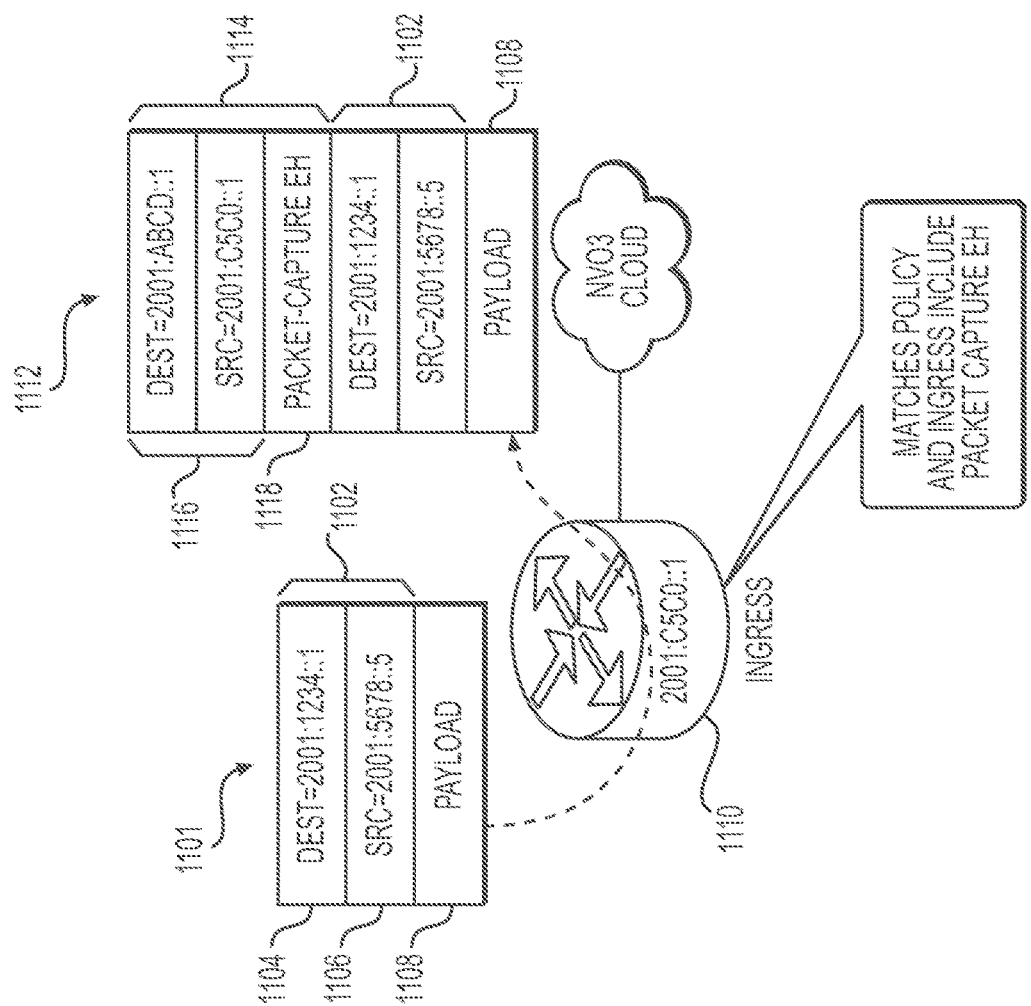
FIGS. 11 and 12 each illustrates IPv6 operations for overlay and underlay transports, in accordance with an illustrative embodiment.
Figure 12:
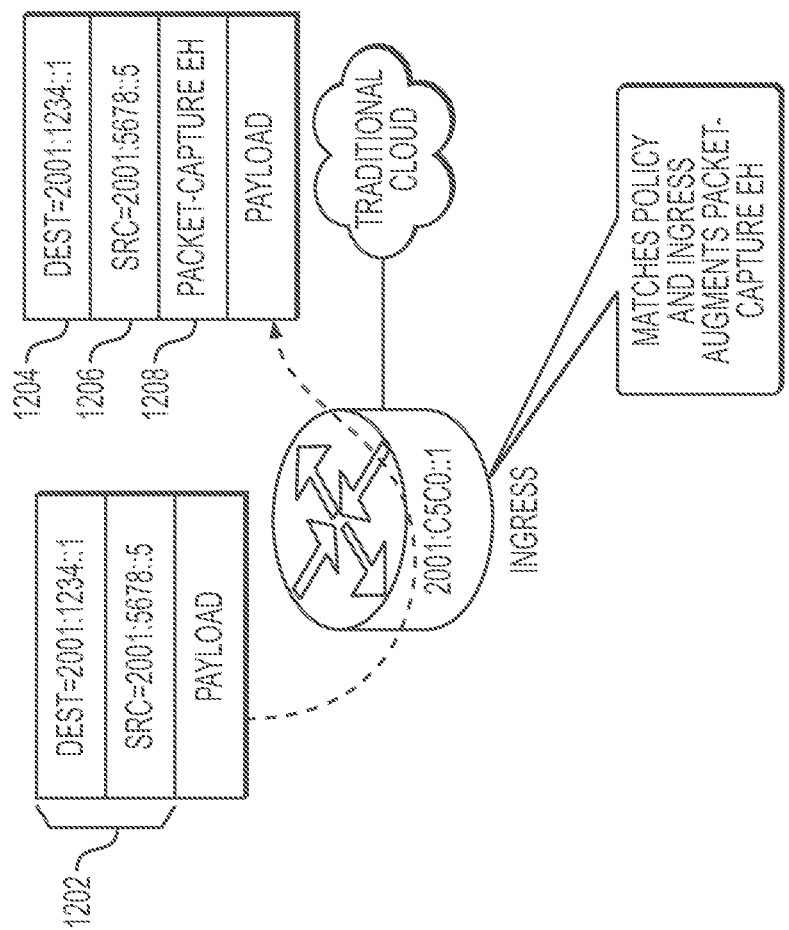

FIGS. 11 and 12 each illustrates IPv6 operations for overlay and underlay transports, in accordance with an illustrative embodiment. An ingress node is configured with a policy to match the incoming traffic and include Packet-Capture EH (e.g., an IPv6 header with an OAM extension header having a capture instruction therein) upon a match. The semantic of this OAM extension header, in this example, is to take a snapshot of the packet in both directions—ingress and egress (e.g., after header rewrite).

As shown in FIG. 11, in scenarios where IPv6 is used as underlay transport network, the extension header (e.g., OAM extension header) is inserted along with a new IPv6 encapsulation header. As shown, the incoming packet 1101 includes a received IPv6 header 1102 (shown as a destination and source fields 1104, 1106 having values "Dest=2001:1234::1" and "Src=2001:5678::5", respectively) that encapsulates a payload 1108. The network node 1110 has an address of "2001:C5C0::1". Upon receiving the IPv6 header 1102 and payload 1108, and determining that the packet 1101 matches the policy to be signaled as a candidate for capture, the network node 1110 generates a modified packet 1112 that includes a new IPv6 header encapsulation 1114 that encapsulates the packet (comprising the IPv6 header 1102 and payload 1108). This encapsulation 1114 includes a new IPv6 header 1116 and OAM extension header 1118 that includes the exemplified capture instructions. The header 1116 includes a destination address for a network node (shown as "Dest=2001:abcd::1") which is designated to capture the packet 1112 (e.g., by storing the packet thereat or forwarding the packet to a remote storage system), and a source address for the node 1110.

In FIG. 12, in traditional IPv6 scenarios, the ingress node is configured to augment an existing IPv6 header 1202 (shown as having a destination address 1204 and source address 1206) by inserting an extension header 1208 to the header 1202. A traditional IPv6 cloud generally refers to a network of devices using IPv6 protocols for underlay transport.

Figure 13:
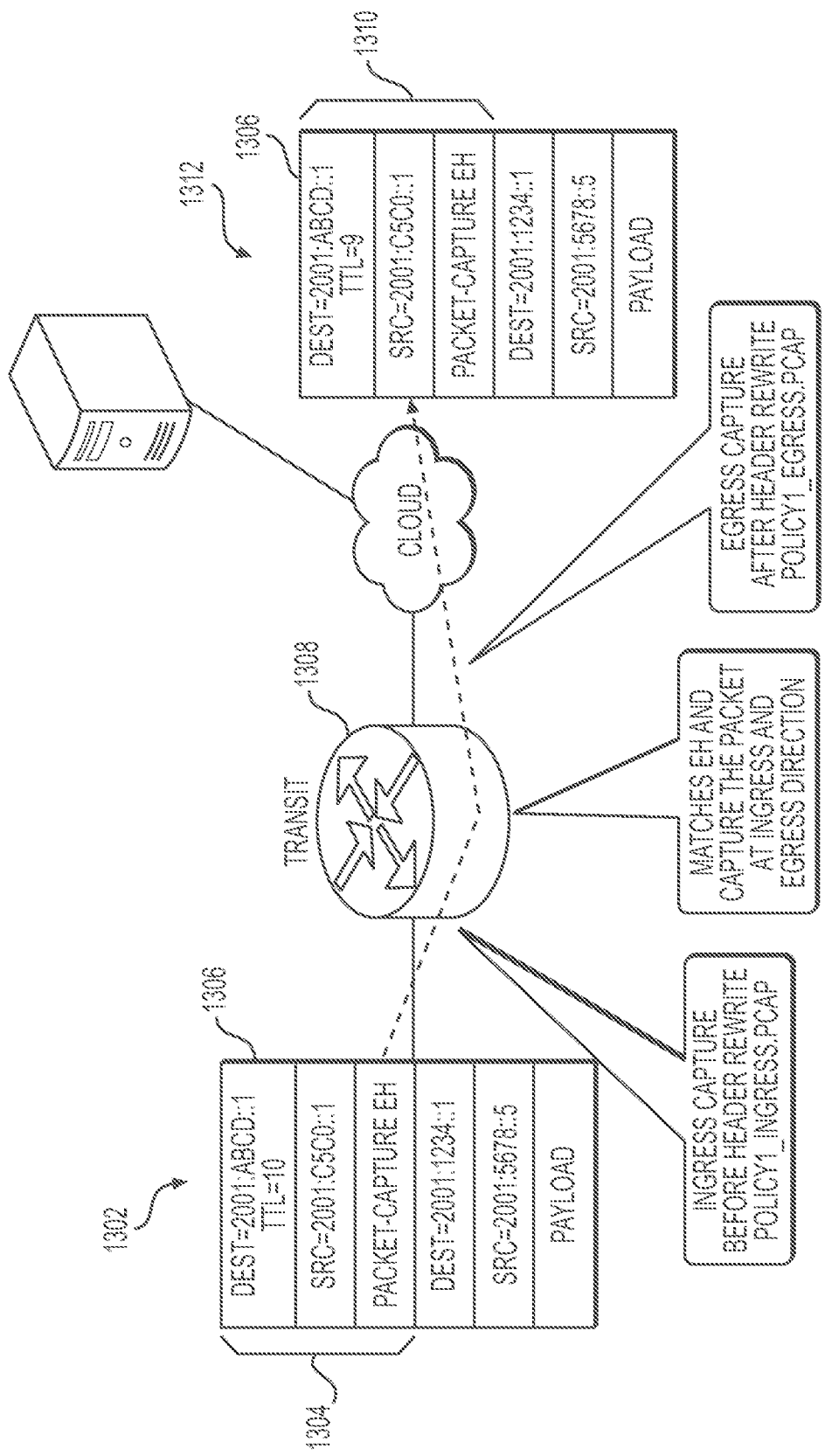
FIG. 13 depicts a diagram illustrating capture operations of IPv6 by a network node, in accordance with an illustrative embodiment.

FIG. 13 depicts a diagram illustrating capture operations of IPv6 by a network node, in accordance with an illustrative embodiment. As discussed, in some embodiments, transit nodes upon receiving an incoming packet with a Packet-Capture EH (e.g., a IPv6 header with an OAM extension header having a capture instruction therein) is configured take a snapshot of the capture on relevant direction depending on the OAM type or flag (ingress alone, egress alone or both). As shown in FIG. 13, upon ingress of a packet 1302 for capture, the IPv6 header and OAM extension header (collectively shown as 1304), among other things, of the packet 1302 are captured prior to the header (e.g., 1306) being modified by the node 1308. When capturing a packet at egress, the IPv6 header and OAM extension header (collectively shown as 1310) are captured after the packet 1312 is generated with the new header data 1310.

Figure 14:
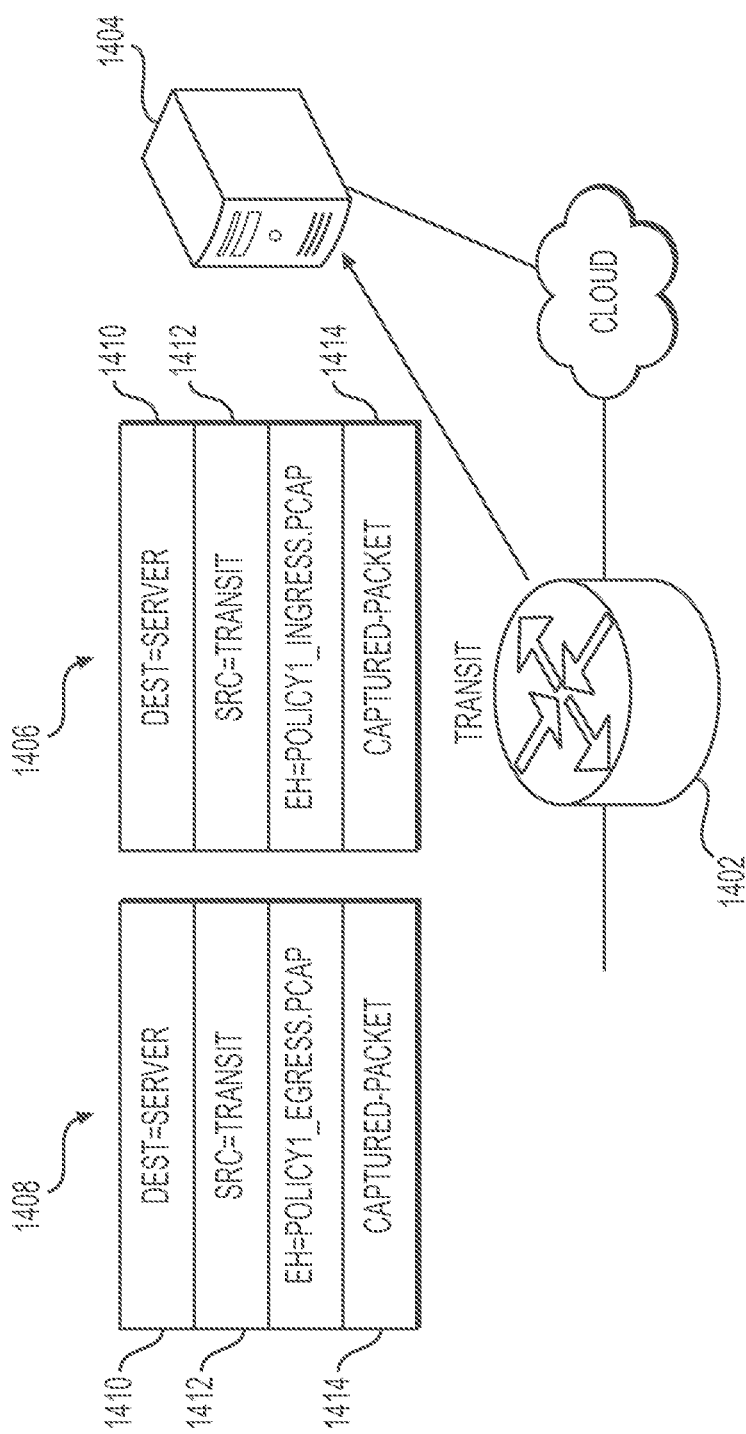
FIG. 14 depicts a diagram illustrating capture actions of a transit node, in accordance with an illustrative embodiment.

FIG. 14 depicts a diagram illustrating capture actions of a transit node, in accordance with an illustrative embodiment. As discussed, in some embodiments, the captured packet can either be saved to as a local copy or forwarded to a server by encapsulating the captured packet with a new IPv6 header and include a destination Extension Header which includes the details about the policy, direction of the capture, time frame etc. As shown in FIG. 14, the transit node 1402 may locally store the captured packet (e.g., 1406 or 1408) upon ingress to or at egress of the node 1402 or may generate and forward the packet (e.g., 1406 or 1408) to a remote storage system 1404 (e.g., a storage area network (SAN)). As shown, the transit node 1402 sends an ingress IPv6 encapsulated captured packet 1406 upon ingress of the packet to the node 1402, and it sends an egress IPv6 encapsulated captured packet 1408 at the egress of the packet from the node, or both. Each encapsulated captured packet (e.g., 1406 or 1408) may include a destination address 1410 that is associated to the remote storage system 1404 and a source address 1412 that is associated with the transit node 1402. The source address may be used to determine the source of the captured packet in subsequent analysis.

In some embodiments, captured packet information (including header data) is used to identify applications operating on a given IPv6 network.

In some embodiments, the captured packet information is used to identify points of intrusions to identify security flaws and breaches.

In some embodiments, the captured packet information is used identify data leakages.

In some embodiments, the captured packet information is used to troubleshoot occurrences of undesired network events.

In some embodiments, the captured packet information is used to identify and/or recover lost or stolen data and packets.

In some embodiments, the captured packet information is used to; determine extent of network elements comprised by virus and malware; assess impact of changes within a network; and ensure long-term compliance issues.

What is claimed is:

1. A method comprising:
   in an IPV6 (Internet Protocol Version 6) network comprising a plurality of network nodes, receiving, at a first network node of the plurality of network nodes, (i) an encapsulated IPv6 data packet having an IPv6 header comprising an OAM (operations, administration and management) extension header, and (ii) a plurality of packet capture policies, wherein the plurality of capture policies comprises at least one of per-flow capture, per-destination capture, per-Virtual-Private-Network session capture, interface type capture, time capture, and packet count capture;
   scanning, at the first network node, the IPv6 header for presence of the OAM extension header and an OAM type field specifying capture semantics including a capture direction;
   capturing, at the first network node, the encapsulated IPv6 data packet based at least on the identified OAM type field;
   determining, at the first network node, a flow to a second network node based at least in part on one or more flow parameters matching at least one of the plurality of capture policies; and
   generating, at the second network node of the plurality of network nodes, the encapsulated IPv6 data packet by duplicating a first IPv6 header of the encapsulated IPv6 data packet and inserting a second IPv6 header before the first IPv6 header.

2. The method of claim 1, wherein the OAM extension header includes a capture instruction that signals at least one network node of the plurality of network nodes, payload of the encapsulated IPv6 data packet as a candidate for capture.

3. The method of claim 2, wherein the IPv6 header includes a destination address associated with a first transit node, and wherein the IPv6 header includes the OAM extension header having the capture instruction.

4. The method of claim 1, wherein the encapsulated IPv6 data packet comprises one or more of a destination address, capture name, and remote capture server.

5. The method of claim 1, wherein the IPv6 network comprises an IPV6 cloud having a transit node, and wherein the one or more capture policies are used to determine a capture event at the transit node.

6. The method of claim 1, wherein capturing the encapsulated IPv6 data packet comprises forwarding the generated encapsulated IPv6 data packet to a remote storage system having an inspection, capture, or storage function.

7. The method of claim 6, further comprising:
   identifying a source of the encapsulated IPv6 data packet in a subsequent analysis.

8. The method of claim 7, wherein the encapsulated IPv6 data packet is used to identify applications operation on at least a portion of the IPv6 network.

9. The method of claim 7, wherein the encapsulated IPv6 data packet is used to identify at least one of points of intrusion, security flaws, security breaches, and data leakages.

10. The method of claim 9, further comprising:
    identifying or recovering lost data or determining an extent of network elements comprised by virus and malware within the IPv6 network.

11. A system comprising:
    a processor; and
    a memory having instructions thereon, wherein the instructions when executed by the processor, cause the processor to:
    in an IPV6 (Internet Protocol Version 6) network comprising a plurality of network nodes, receiving, at a first network node of the plurality of network nodes, (i) an encapsulated IPv6 data packet having an IPv6 header comprising an OAM (operations, administration and management) extension header, and (ii) a plurality of packet capture policies, wherein the plurality of capture policies comprises at least one of per-flow capture, per-destination capture, per-Virtual-Private-Network session capture, interface type capture, time capture, and packet count capture;
    scan, at the first network node, the IPv6 header for presence of the OAM extension header and an OAM type field specifying capture semantics including a capture direction;
    capture, at the first network node, the encapsulated IPv6 data packet based at least on the identified OAM type field;
    determine, at the first network node, a flow to a second network node based at least in part on one or more flow parameters matching at least one of the plurality of capture policies; and;
    generate, at a second network node of the plurality of network nodes, the encapsulated IPV6 data packet by duplicating a first IPv6 header of the encapsulated IPv6 data packet and inserting a second IPv6 header before the first IPv6 header.

12. The system of claim 11, wherein the OAM extension header includes a capture instruction that signals at least one network node of the plurality of network nodes, payload of the encapsulated IPv6 data packet as a candidate for capture.

13. The system of claim 12, wherein the IPv6 header includes a destination address associated with a first transit node, and wherein the IPv6 header includes the OAM extension header having the capture instruction.

14. The system of claim 11, wherein the encapsulated IPv6 data packet comprises one or more of a destination address, capture name, and remote capture server.

15. The system of claim 11, wherein the IPv6 network comprises an IPV6 cloud having a transit node, and wherein the one or more capture policies are used to determine a capture event at the transit node.

16. The system of claim 11, wherein capturing the encapsulated IPv6 data packet comprises forwarding the generated encapsulated IPv6 data packet to a remote storage system having an inspection, capture, or storage function.

17. The system of claim 16, further comprising:
identifying a source of the encapsulated IPv6 data packet in a subsequent analysis.

18. The system of claim 17, wherein the encapsulated IPv6 data packet is used to identify applications operation on at least a portion of the IPv6 network.

19. The system of claim 17, wherein the encapsulated IPv6 data packet is used to identify at least one of points of intrusion, security flaws, security breaches, and data leakages.

20. The system of claim 19, wherein the instructions further cause the processor to:
identify or recover lost data or determining an extent of network elements comprised by virus and malware within the IPv6 network.

* * * * *